(12) United States Patent
McDonald

(10) Patent No.: US 9,044,081 B2
(45) Date of Patent: Jun. 2, 2015

(54) OBJECT CARRYING DEVICE

(76) Inventor: Greg Francis McDonald, Spotswood (AU)

(*) Notice: Subject to any disclaimer, the term of this patent is extended or adjusted under 35 U.S.C. 154(b) by 0 days.

(21) Appl. No.: 14/005,667

(22) PCT Filed: Mar. 14, 2012

(86) PCT No.: PCT/AU2012/000264
§ 371 (c)(1),
(2), (4) Date: Sep. 17, 2013

(87) PCT Pub. No.: WO2012/122598
PCT Pub. Date: Sep. 20, 2012

(65) Prior Publication Data
US 2014/0001221 A1    Jan. 2, 2014

(30) Foreign Application Priority Data

Mar. 17, 2011 (AU) ................................. 2011900953

(51) Int. Cl.
*B65G 7/12* (2006.01)
*A45F 3/14* (2006.01)
*A45F 5/00* (2006.01)

(52) U.S. Cl.
CPC ............. *A45F 3/14* (2013.01); *A45F 2003/142* (2013.01); *B65G 7/12* (2013.01); *A45F 2003/144* (2013.01); *A45F 2003/146* (2013.01); *A45F 2005/002* (2013.01)

(58) Field of Classification Search
CPC ............. B65G 7/12; A45C 13/38; A45F 3/14

USPC ......... 224/157, 184, 259, 260, 262, 266, 268, 224/270
See application file for complete search history.

(56) References Cited

U.S. PATENT DOCUMENTS

| 2,651,441 | A | * | 9/1953 | Rau et al. ....................... 224/259 |
| 3,181,752 | A | * | 5/1965 | Seltzer et al. .................. 224/260 |
| 3,327,914 | A |   | 6/1967 | Abram |
| 3,343,735 | A | * | 9/1967 | Breeding et al. .............. 224/242 |
| 3,377,007 | A |   | 4/1968 | Gayler, Jr. |
| 4,013,202 | A |   | 3/1977 | Russo |
| 4,135,655 | A |   | 1/1979 | Brown |
| 4,190,278 | A |   | 2/1980 | Jancik, Jr. |
| 4,280,645 | A | * | 7/1981 | Goodden ....................... 224/259 |
| 4,319,704 | A | * | 3/1982 | Rosen ........................... 224/270 |
| 4,804,025 | A |   | 2/1989 | Bear |
| 4,830,247 | A | * | 5/1989 | Banks ........................... 224/666 |
| 5,009,349 | A |   | 4/1991 | Eide et al. |
| 5,131,576 | A | * | 7/1992 | Turnipseed .................... 224/262 |
| 5,226,688 | A |   | 7/1993 | Russo et al. |
| 5,437,401 | A |   | 8/1995 | Seltzer |
| 5,490,618 | A | * | 2/1996 | Davidson ................... 224/148.4 |
| 5,511,707 | A | * | 4/1996 | Reichert ........................ 224/270 |
| 5,609,283 | A | * | 3/1997 | Harrison, Jr. ................. 224/678 |
| 5,620,121 | A | * | 4/1997 | Watson .......................... 224/272 |

(Continued)

OTHER PUBLICATIONS

International Search Report mailed May 25, 2012; PCT/AU2012/000264.

*Primary Examiner* — Justin Larson
(74) *Attorney, Agent, or Firm* — Flener IP Law; Zareefa B. Flener

(57) ABSTRACT

An object carrying device comprising a body harness and an object carrying portion disposed on the body harness, the object carrying portion comprising a support member for supporting an object thereon.

13 Claims, 15 Drawing Sheets

(56) References Cited

U.S. PATENT DOCUMENTS

| | | | |
|---|---|---|---|
| 5,791,538 A * | 8/1998 | Bain, III | 224/663 |
| 5,826,763 A * | 10/1998 | Roberts | 224/270 |
| 5,941,436 A * | 8/1999 | Washington et al. | 224/270 |
| 5,967,145 A | 10/1999 | Knapik et al. | |
| 6,371,346 B1 | 4/2002 | Sharma | |
| 7,175,061 B2 * | 2/2007 | Dohn | 224/673 |
| D641,975 S * | 7/2011 | Tinius | D3/228 |
| 8,631,984 B2 * | 1/2014 | Carlsson | 224/578 |
| 2002/0148866 A1 | 10/2002 | Dent, III | |
| 2003/0052144 A1 | 3/2003 | Vardi | |
| 2004/0056056 A1 | 3/2004 | Fabricius | |
| 2004/0094586 A1 | 5/2004 | MacAllister | |
| 2005/0161479 A1 * | 7/2005 | Licsko | 224/270 |
| 2007/0017945 A1 * | 1/2007 | Willis | 224/270 |
| 2009/0179055 A1 * | 7/2009 | Estrellado | 224/269 |
| 2013/0056508 A1 * | 3/2013 | Ahearn | 224/260 |

* cited by examiner

OBJECT CARRYING DEVICE

TECHNICAL FIELD

The present invention relates to an object carrying device. In a particular aspect the invention relates to a body worn device used to carry an elongate object such as a glass sheet.

BACKGROUND ART

Furniture removalists and the like are often required to carry around large, heavy or cumbersome elongate objects such as glass sheets, table tops, and mattresses. This is can be a difficult and potentially dangerous task in view of the possible injury that might be sustained by a user from the awkward heavy lifting and also the damage that may be caused to the objects themselves when being hauled around in an unwieldy manner. In many cases more than one removalist will be required to carry the cumbersome elongate objects, and even with the extra manpower this may still be quite a difficult and potentially dangerous task. Thus it may be advantageous to provide a new device which facilitates the carrying of objects by a user.

DISCLOSURE OF THE INVENTION

In one aspect the invention may provide an object carrying device comprising,
 a body harness, and
 an object carrying portion disposed on the body harness, the object carrying portion comprising a support member for supporting an object thereon.

The support member may comprise a projecting member arranged to project outwardly, away from the body of the user when carrying the object.

The support member may be height adjustable.

The support member may be pivotable between a carrying position for supporting the object and a folded position when not supporting the object.

The object carrying portion may comprise a body member adapted to hug against the body of a user. Specifically, the body member may hug against the thigh of a user.

The body member may comprise a body plate. The body plate may be curved to conform to the shape of a user's thigh or trunk.

The projecting member may be connected to or formed with the body plate and project outwardly therefrom.

The object carrying portion may comprise adjustment means for enabling height adjustment of the support member.

The support member may comprise a support attachment portion. The support attachment portion may comprise a projecting portion. There may be several projecting portions.

The body member may comprise an attachment element. The attachment element may comprise a receiving portion adapted to receive the projecting portion of the support member. The receiving portion may comprise a plurality of apertures. The apertures may be arranged vertically for enabling height adjustment of the support member.

The projecting portion may comprise a projecting hook. There may be a plurality of projecting hooks.

In addition to, or instead of, the projecting hook, the projecting portion may comprise a hook and loop fastener strap for fastening the support member to the body member.

In an alternative form, the body member may comprise the attachment portion and the support member may comprise the attachment element.

The support member may comprise a gripping surface on which the object is supported.

The support member may comprise a lateral lip adapted to limit lateral movement of the object on the support member.

The support member may comprise a retaining lip. The retaining lip may be laterally placed on the support member.

The body member may further comprise a cushion. The cushion may be present along the inner surface of the body plate.

The support member may be adapted to carry objects of various shapes and sizes. The support member may be adapted to support cumbersome objects.

The object may comprise a panel, sheet or other similarly shaped object. In one form, the object may comprise a mattress.

The support member may be adapted to support an elongate object. It may be adapted to support the length of the elongate object. In particular, the support member may be adapted to support the length of the elongate object about its central third.

The support member may be adapted to support an elongate object with a narrow width compared to its length. For instance, the ratio of width to length may be between 1:10 and 1:400. Preferably the width of the object is less than 30 cm.

The support member may be adapted to support an elongate object with a ratio of height to length between 10:1 and 1:10. In its suitable form the height of the elongate member is between one third and two thirds that of the length of the elongate member. Preferably, the height of the elongate member is roughly about half of the length of the elongate member.

In another form, the elongate object may comprise a beam.

The body harness may comprise a first shoulder strap adapted to be slung over a shoulder of the user. Further, the body harness may comprise a second shoulder strap, adapted to be slung over the opposite shoulder of the user to that of the first shoulder strap.

The body harness may comprise a waist strap adapted to wrap around the waist of a user. The first shoulder strap may be attached to the waist, strap. Similarly, the second shoulder strap may be attached to the waist strap.

The body harness may comprise a chest strap attached between the first and second shoulder straps.

The body harness may comprise a first suspension strap which is attachable to the object carrying portion. Additionally, there may be a second suspension strap which is attachable to the object carrying portion.

The first suspension strap, or the first and second suspension straps, may attach to the object carrying portion towards one side of the users body.

Thus, the object carrying portion may be positioned towards one side of the user's body. For instance, the object carrying portion may be located laterally or anterolaterally against one side of the user, such as one of the user's thighs or one side of their trunk. Preferably, the object carrying portion is suspended against one of the user's thighs.

The body harness may further comprise a transverse strap adapted to extend across the user's body and attach to the object carrying portion.

The first suspension strap, or second suspension strap, or transverse strap, may be attached at its upper end to the waist strap.

One or more of the straps may be adjustable in length. One or more of the straps may comprise a buckle. The or each buckle may allow lengthwise adjustment of the respective strap.

In another version, the first and second shoulder straps may cross over at the front and/or rear of the user's torso before inserting into the waist strap or belt. The first and second shoulder straps and the waist strap may be lengthwise adjustable.

There may be a waist padding which is fastened or fastenable to the inside of the waist strap. Suitably, the waist padding may be fastened by a hook and loop fastener. The position of the waist padding may be adjustable along part of the length of the waist strap. There may be two waist padding pieces adapted to be located on opposite sides of the user's waste. The padding may also be fastened or fastenable to the body plate.

The object carrying portion may be removably engaged with the body harness.

Suitably, the object carrying portion may be engaged on either side of the user's body. In an alternative form, there may be two object carrying portions engaged on opposite sides of the body.

The position of the object carrying portion may be adjustable around the user's waist. Thus, the object carrying device may be adjustable along the waist belt. The position of the body member may be adjusted between a lateral position on the user's thigh and a more anterior position on the user's thigh.

The object carrying portion may comprise a hooking member adapted for removable engagement and lengthwise adjustment with the harness. Suitably, the hooking member is removably engagable with, and adjustable along, the waist strap.

The projecting portion may comprise a screw. The receiving portion may comprise a threaded recess adapted to receive the screw.

In another aspect the invention may comprise a method of carrying an object with an object carrying device, the object carrying device comprising a body harness and an object carrying portion disposed on the body harness, the object carrying portion comprising a support member for supporting an object thereon, the method comprising the steps of:
- wearing the body harness so that the support member is positioned to one side of the user's body,
- placing the object on the support member so that the length of the object is supported about its middle third,
- placing one hand on the top length of the object.

The method may further comprise placing the other hand on the underside of the object adjacent and behind the support member.

BRIEF DESCRIPTION OF THE DRAWINGS

In order that the invention may be more clearly understood and put into practical effect there shall now be described in detail preferred embodiments of the invention. The ensuing description is given by way of non-limitative examples only and is with reference to the accompanying drawing, wherein.

MODES FOR CARRYING OUT THE INVENTION

Figure 1:
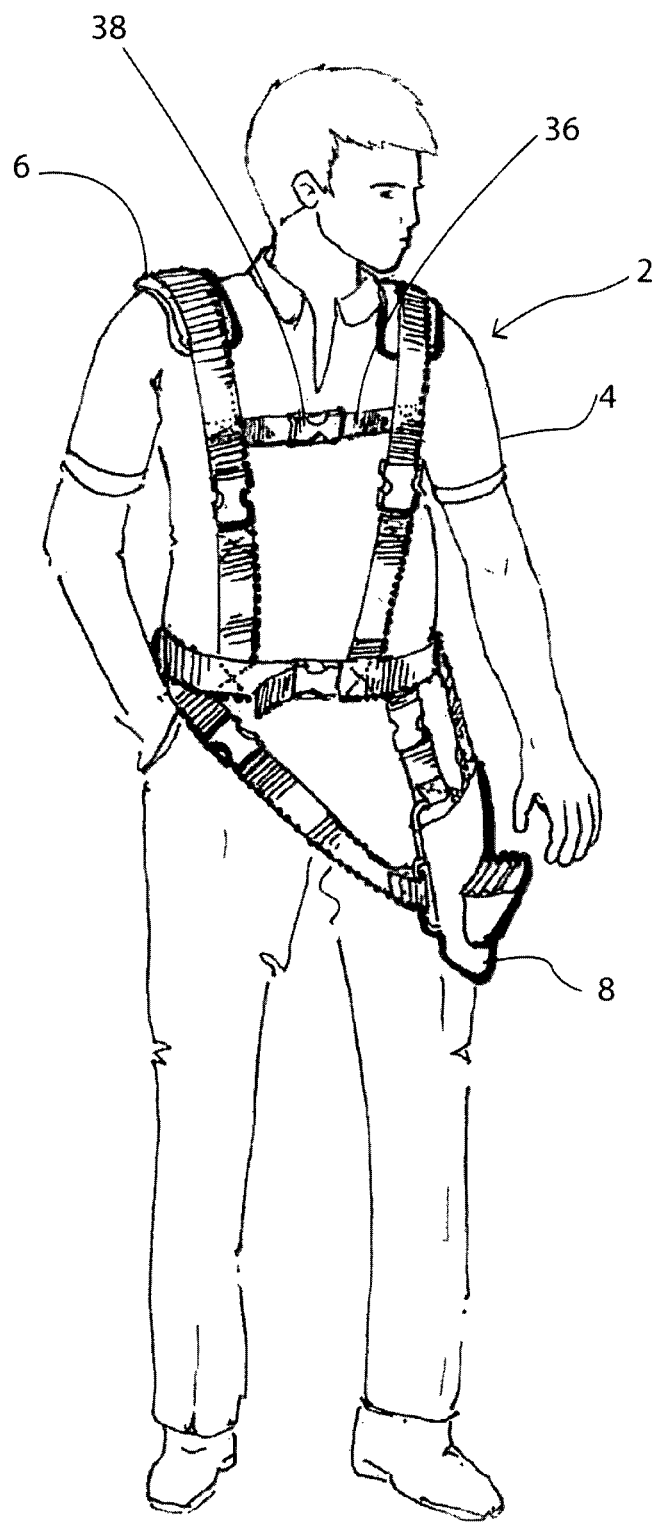
FIG. 1 is a front perspective view of a user wearing an object carrying device in accordance with the invention.

Referring to FIG. 1, there is shown an object carrying device, generally designated 2, being worn by a user 4. The object carrying device 2 comprises a body harness 6, and an object carrying portion 8 attached to the body harness 6.

Referring now to the various embodiments of object carrying device 2 shown in FIGS. 2-5, the body harness 6 comprises a first shoulder strap 10, a second shoulder strap 12, a waist strap 14, a first suspension strap 16, a second suspension strap 18, and a transverse strap 20.

When the object carrying device 2 is being worn by the user 4, the first shoulder strap 10 is slung over one of the user's shoulders, that being the user's right shoulder in the embodiments shown in the drawings. At the apex of the first shoulder strap 10 is a first shoulder pad 22 for cushioning the user's shoulder. The first shoulder strap 10 further comprises a buckle 24 for enabling separation and closure of the strap, as well as enabling length adjustment of the first shoulder strap 10.

The second shoulder strap 12 is slung over the opposite shoulder to the first shoulder strap 10, when the object carrying device 2 is being worn by the user 4. Like the first shoulder strap 10, the second shoulder strap 12 has a second shoulder pad 26 and a buckle 28 for length adjustment and separation thereof.

The first shoulder strap 10 attaches at its front end to the waist strap 14 anteriorly and at its back end to the waist strap 14 posteriorly. Similarly, the second shoulder strap 12 attaches at its front end to the waist strap 14 anteriorly and at its rear end to the waist strap posteriorly.

When worn, the waist strap 14 wraps around the waist of the user 4. The waist strap 14 comprises a buckle 30 located anteriorly and centrally, between the front attachments of the first and second shoulder straps, 10 and 12 respectively, the buckle being adapted for lengthwise adjustment of the waist strap 14 and opening and closing thereof.

The first and second suspension straps, 16 and 18 respectively, extend substantially parallel to each other, and downwardly from their top attachments to the waist strap 14. They are located on the opposite side of the user to the first shoulder strap 10, i.e. on the left side of the user for the embodiments shown. The first suspension strap 16 is positioned further anteriorly than the second suspension strap 18 which is positioned more laterally. Each of the first and second shoulder straps has a lengthwise adjustable buckle 32 which enables separation thereof. The bottom end of the first and second suspension straps, 16 and 18 respectively, attach to the top of the object carrying portion 8.

The transverse strap 20 extends across the front of the user's body, attaching at its top end to the waist strap 14 on the same side as the first shoulder strap 10 and laterally thereto, and attaching at its bottom end to the object carrying portion 8. The transverse strap 20 comprises a buckle 34 which enables lengthwise adjustment or separation of the transverse strap 20.

In a preferred form, the body harness 6 may further comprise a chest strap 36 (see FIG. 1) which extends between the first and second shoulder straps, 10 and 12 respectively, across the chest of the user 4. The chest strap comprises a buckle 38 enabling lengthwise adjustment or separation of the chest strap 36.

Figure 6:
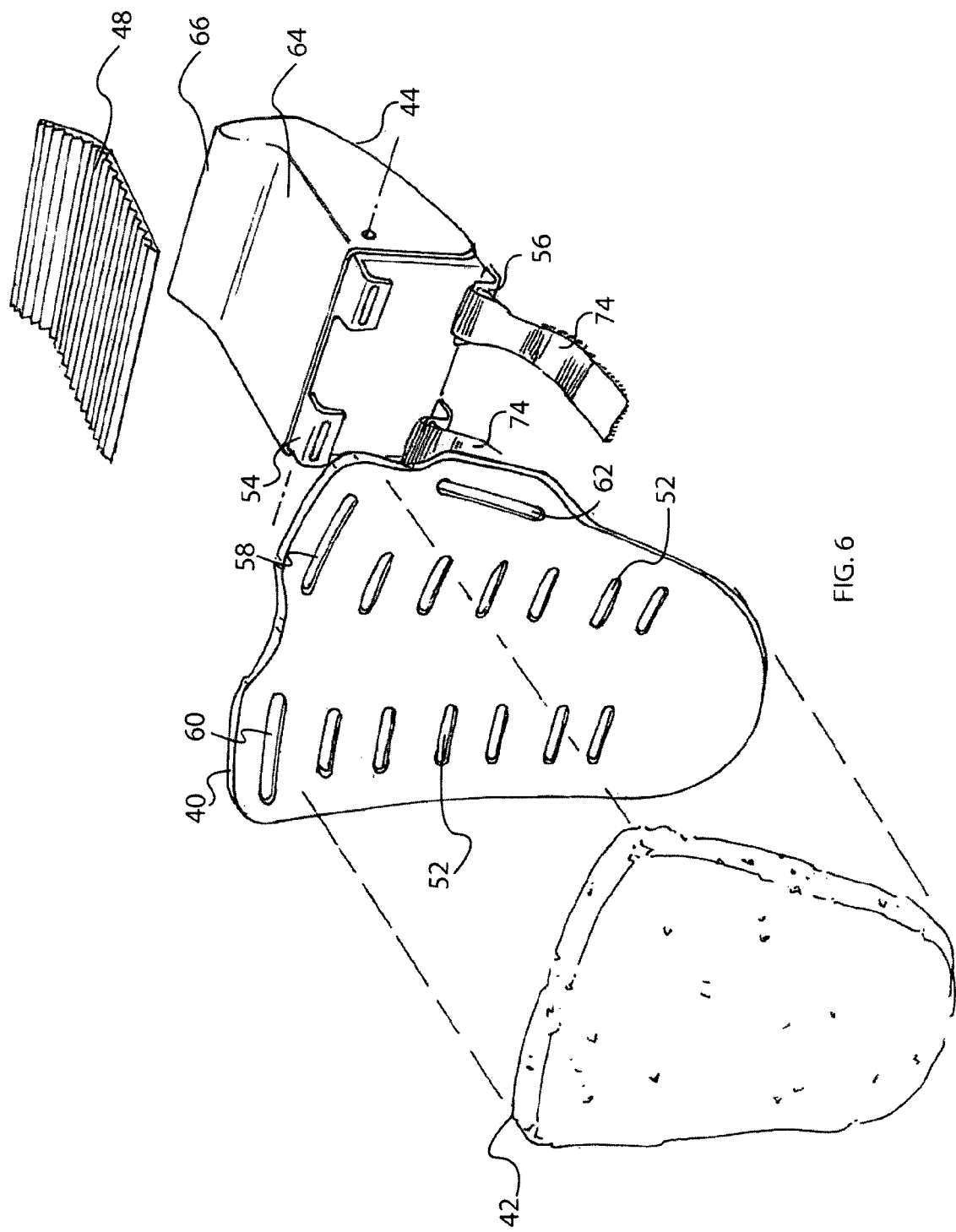
FIG. 6 is an exploded perspective view of an object carrying portion of an object carrying device shown from the rear.
Figure 7:
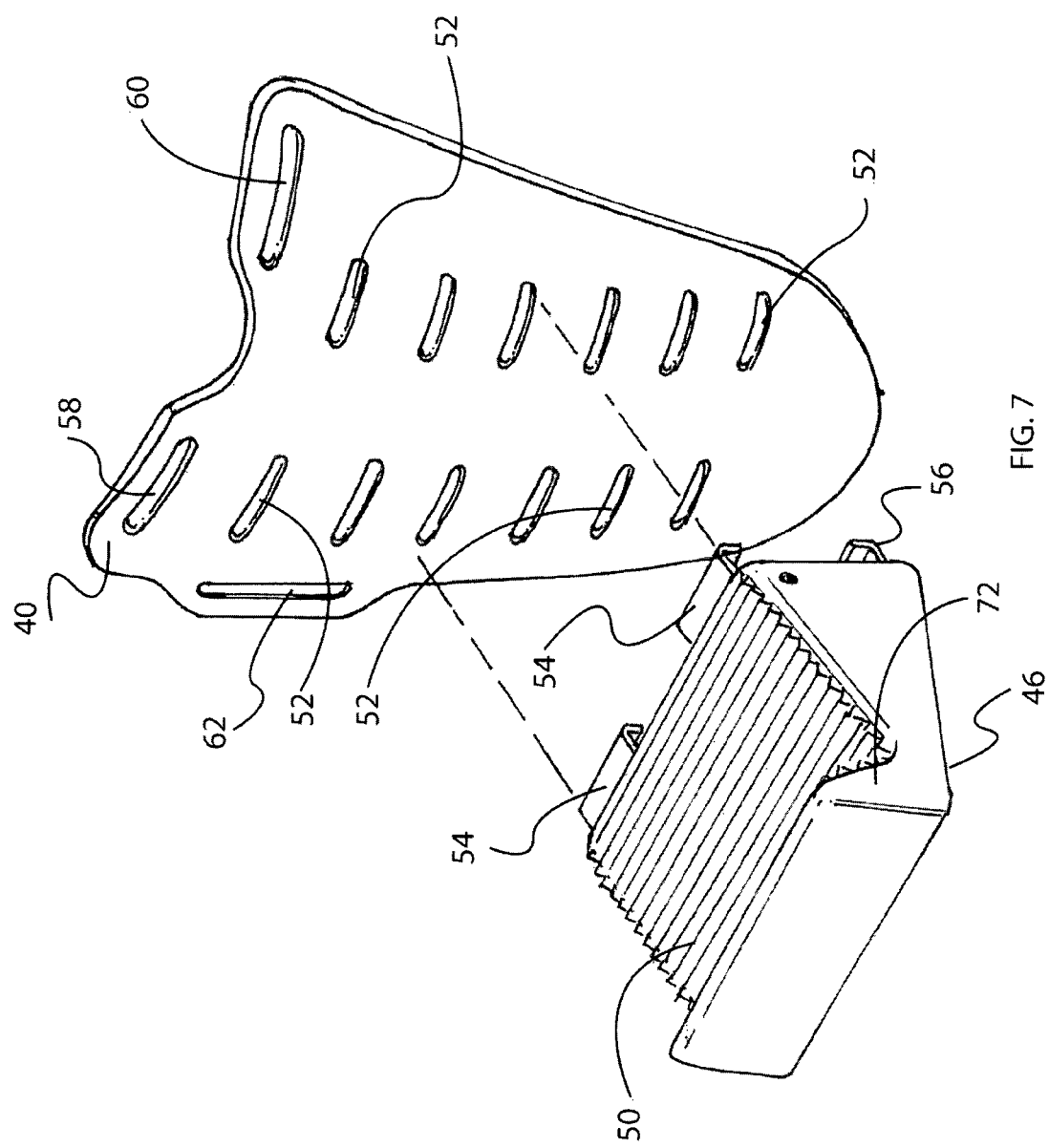
FIG. 7 is a perspective view of an object carrying portion of an object carrying device shown from the front.

Referring now to FIGS. 6 and 7, the object carrying portion 8 comprises a body plate 40, a cushion 42, a projecting member (44 in FIGS. 6 and 46 in FIG. 7) and a gripping surface (48 in FIGS. 6 and 50 in FIG. 7).

The body plate 40 is shaped like a shield and curved to hug against the lateral aspect of the user's thigh. The body plate 40 comprises a series of vertically spaced paired apertures 52, adapted to receive top and bottom paired hooks, 54 and 56 respectively, extending rearwardly from the rear surface of the projecting member 44 or 46.

The body plate 40 further comprises a first suspension aperture 58 towards the top and right side thereof, and a second suspension aperture 60 towards the top and left side thereof. The first suspension aperture 58 is adapted to receive the first suspension strap therethrough, and the second suspension aperture 60 is adapted to receive the second suspension strap therethrough, thereby suspending the body plate 40 from the body harness 6.

The body plate 40 further comprises a side aperture 62 towards the upper right side thereof, the side aperture being adapted to receive the transverse strap therethrough, thereby attaching the transverse strap 20 to the body plate 40.

The cushion 42 is shaped to correspond with the body plate 40 and may be removably attached to the inner surface of the body plate 40. The cushion 42 helps to relieve pressure against the user's thigh when carrying objects on the object carrying portion.

Figure 9:
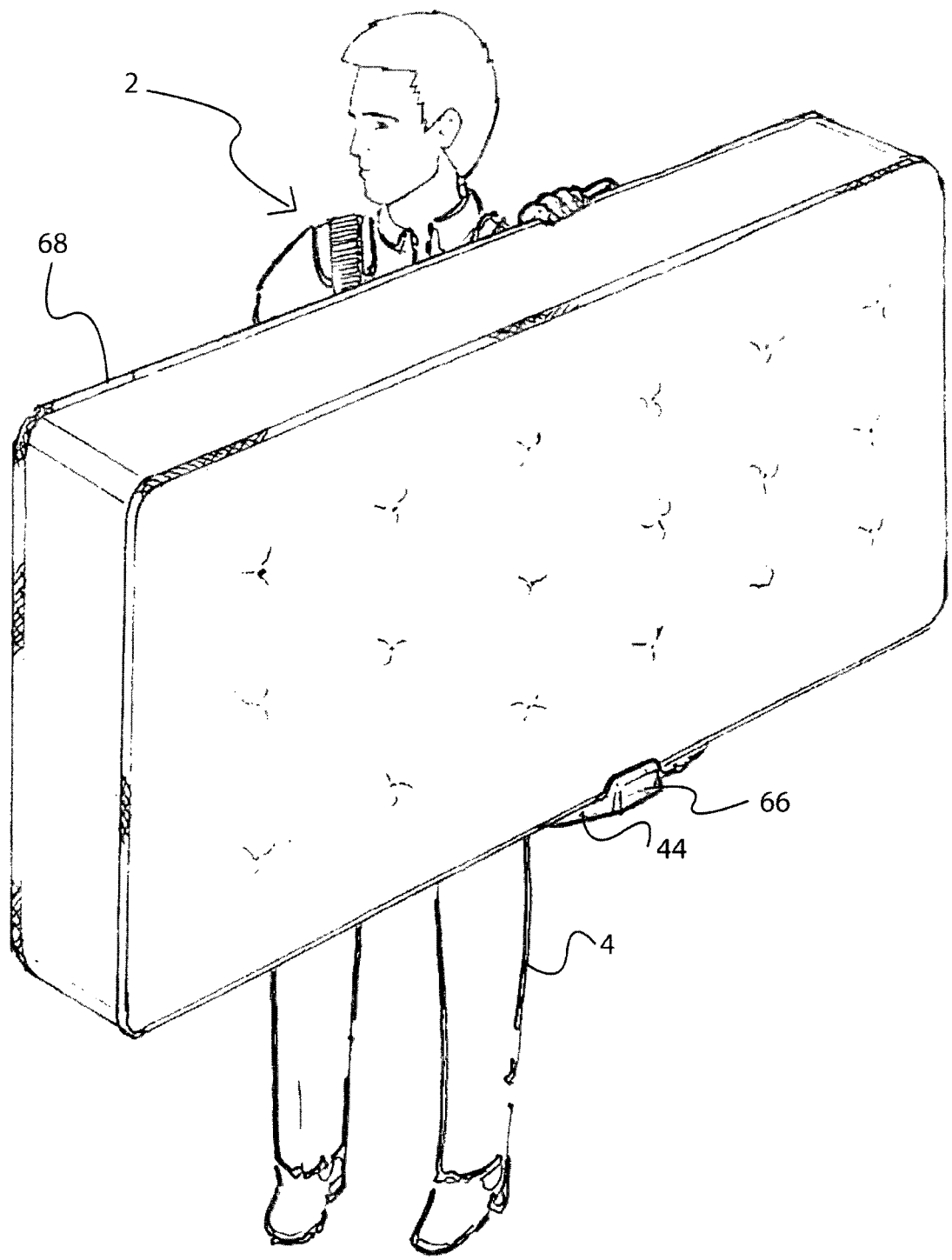
FIG. 9 is a perspective view of a user carrying a mattress with an object carrying device.
Figure 10:
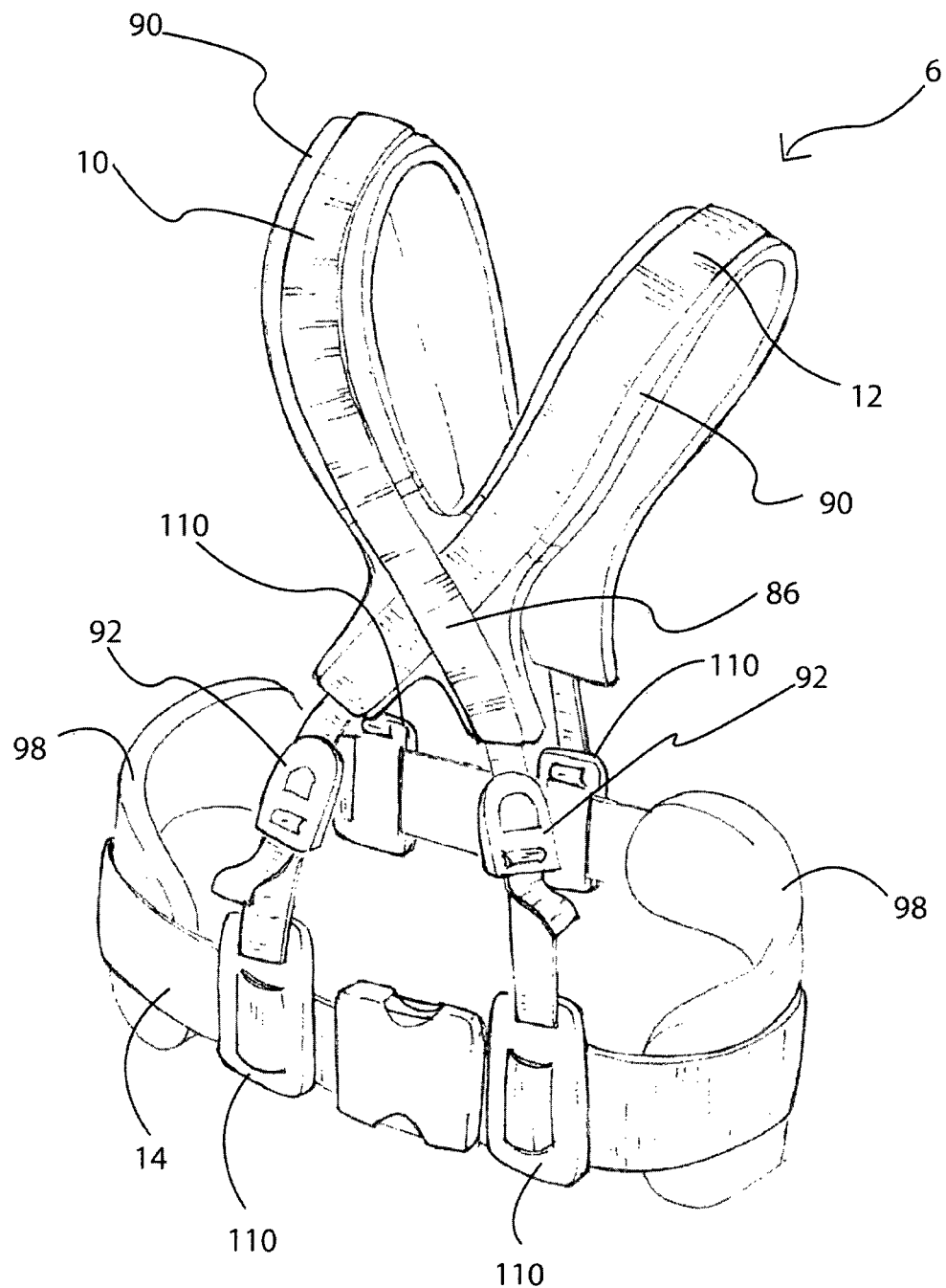
FIG. 10 is a front perspective view of a body harness of an object carrying device with shoulder straps intended to cross in front of and behind the user.
Figure 11:
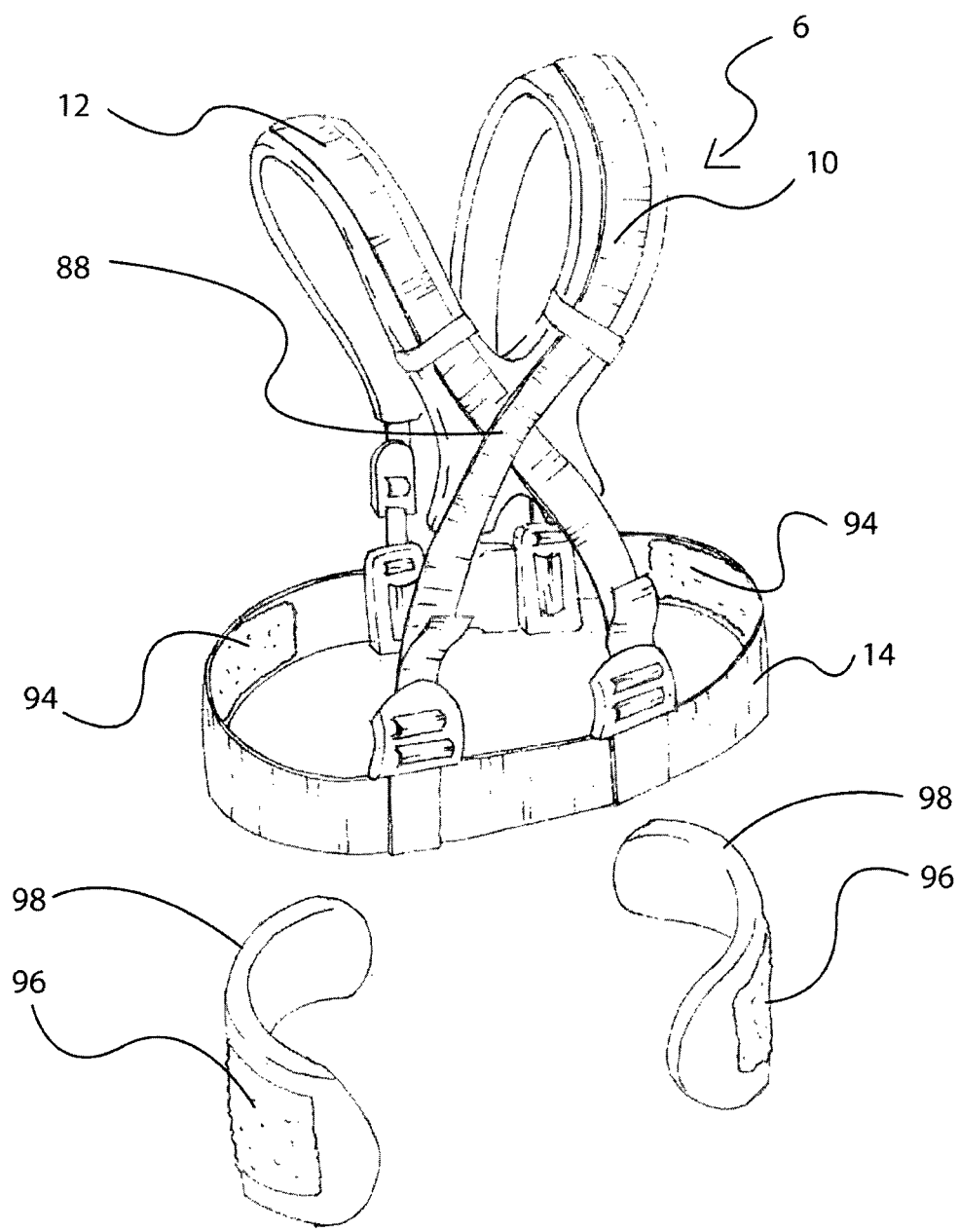
FIG. 11 is an exploded rear perspective view of the body harness of FIG. 10.
Figure 13:
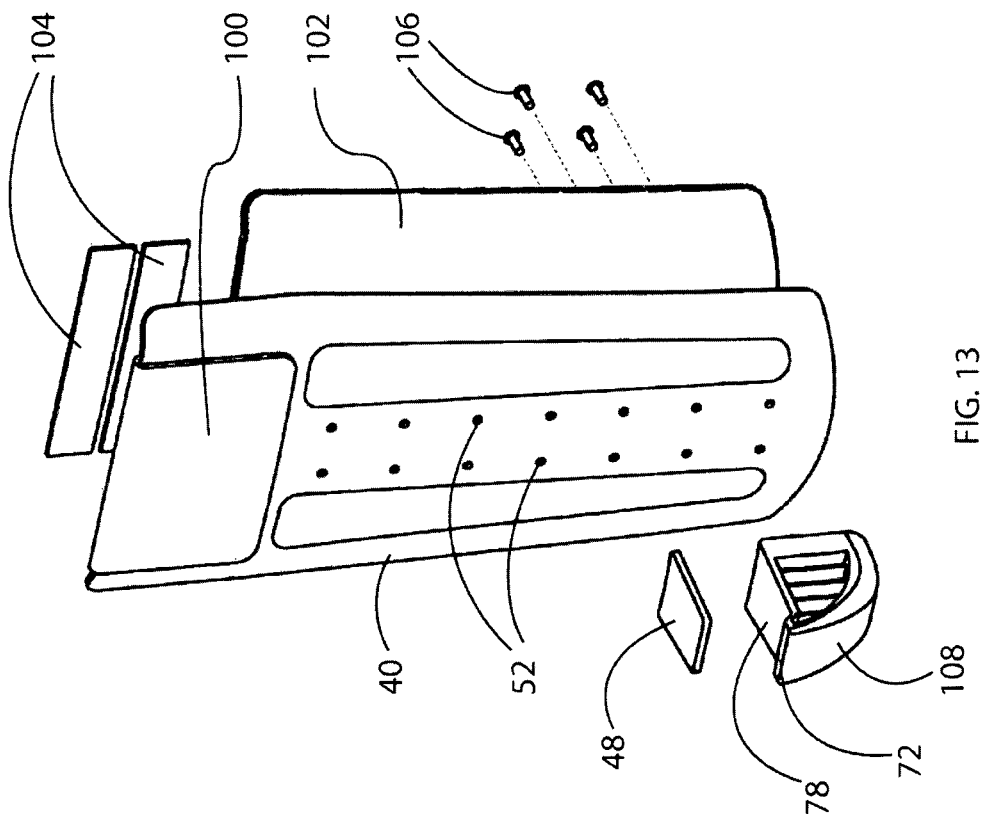
FIG. 13 is an exploded front perspective view of the object carrying portion of FIG. 12.
Figure 12:
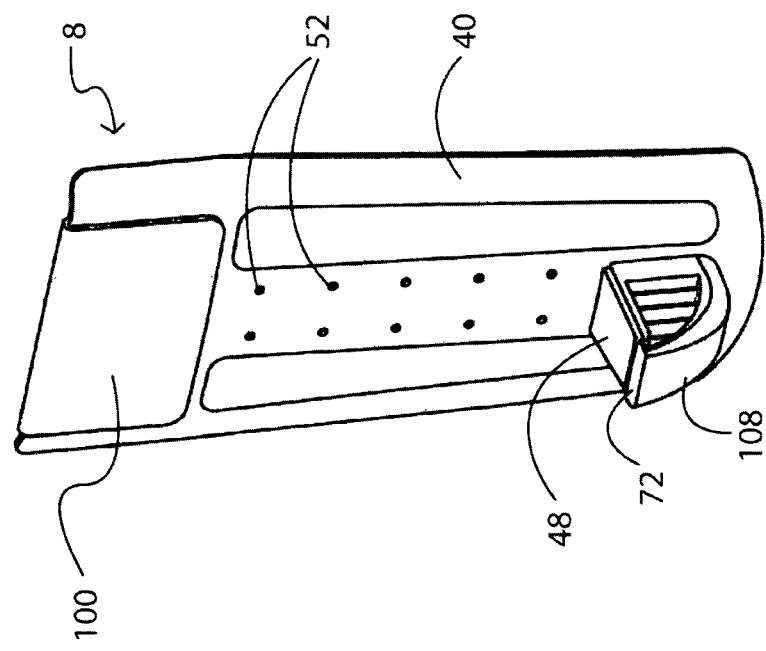
FIG. 12 is a front perspective view of an object carrying portion with an elongated thigh plate.
Figure 15:
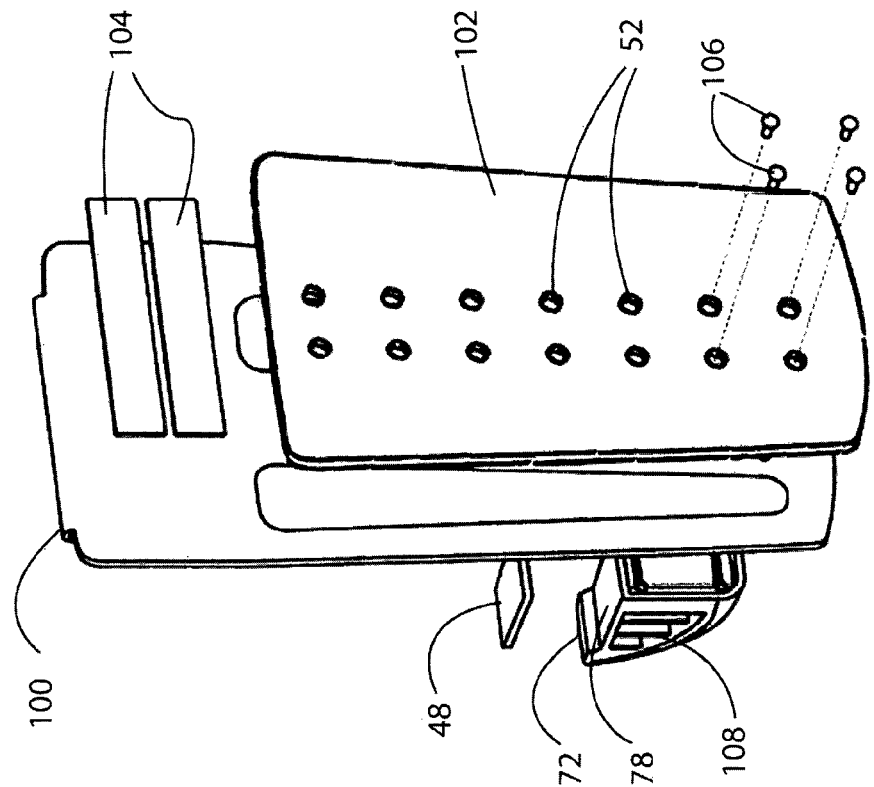
FIG. 15 is an exploded rear perspective view of the object carrying portion of FIG. 12.
Figure 14:
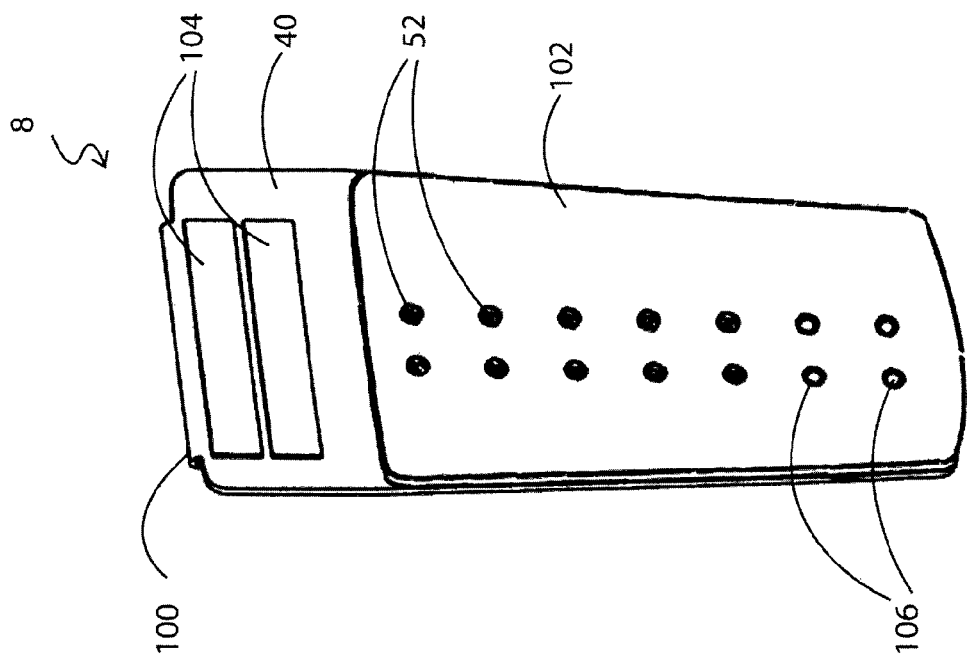
FIG. 14 is a rear perspective view of the object carrying portion of FIG. 12.
Figure 16:
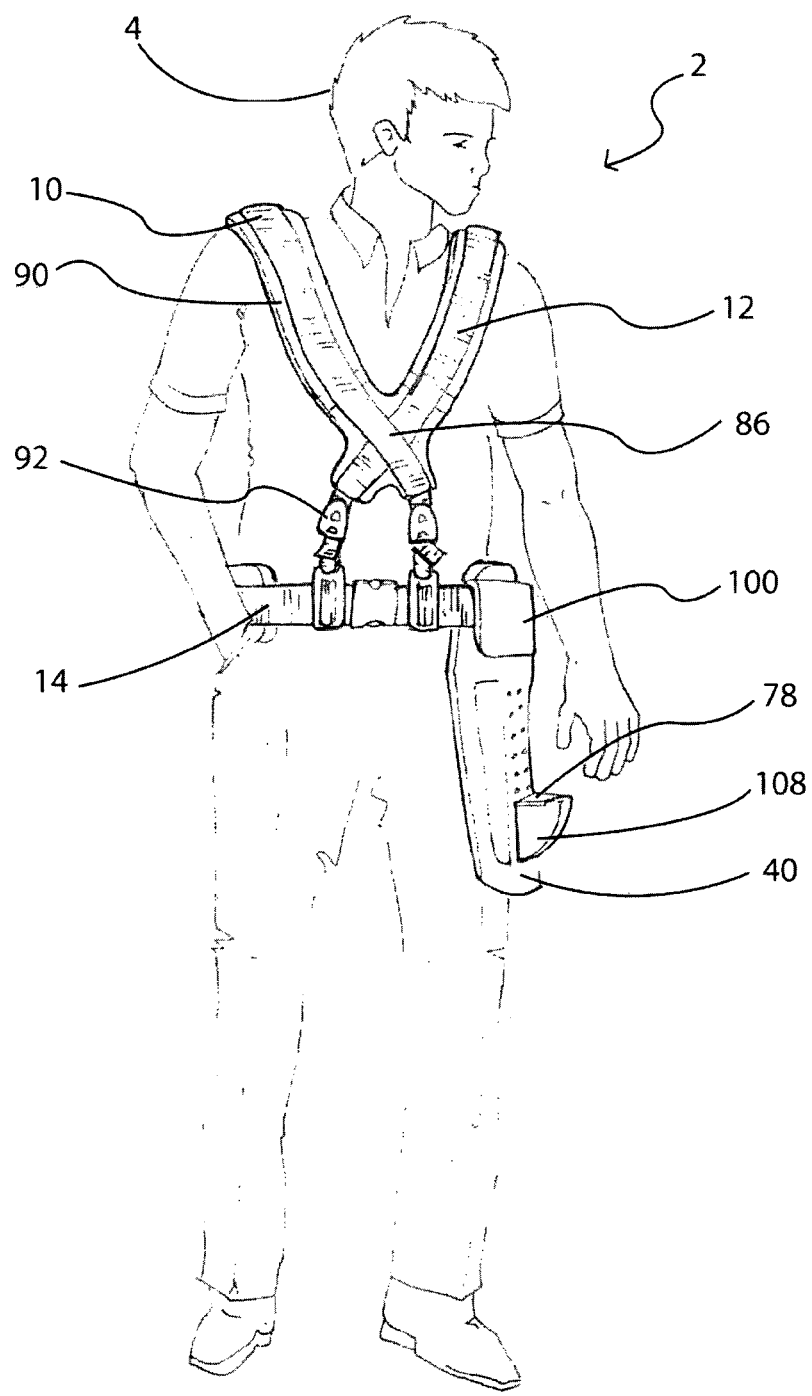
FIG. 16 is a front perspective view of a user wearing an object carrying device made up of the body harness of FIG. 10 and the object carrying portion of FIG. 12.
Figure 17:
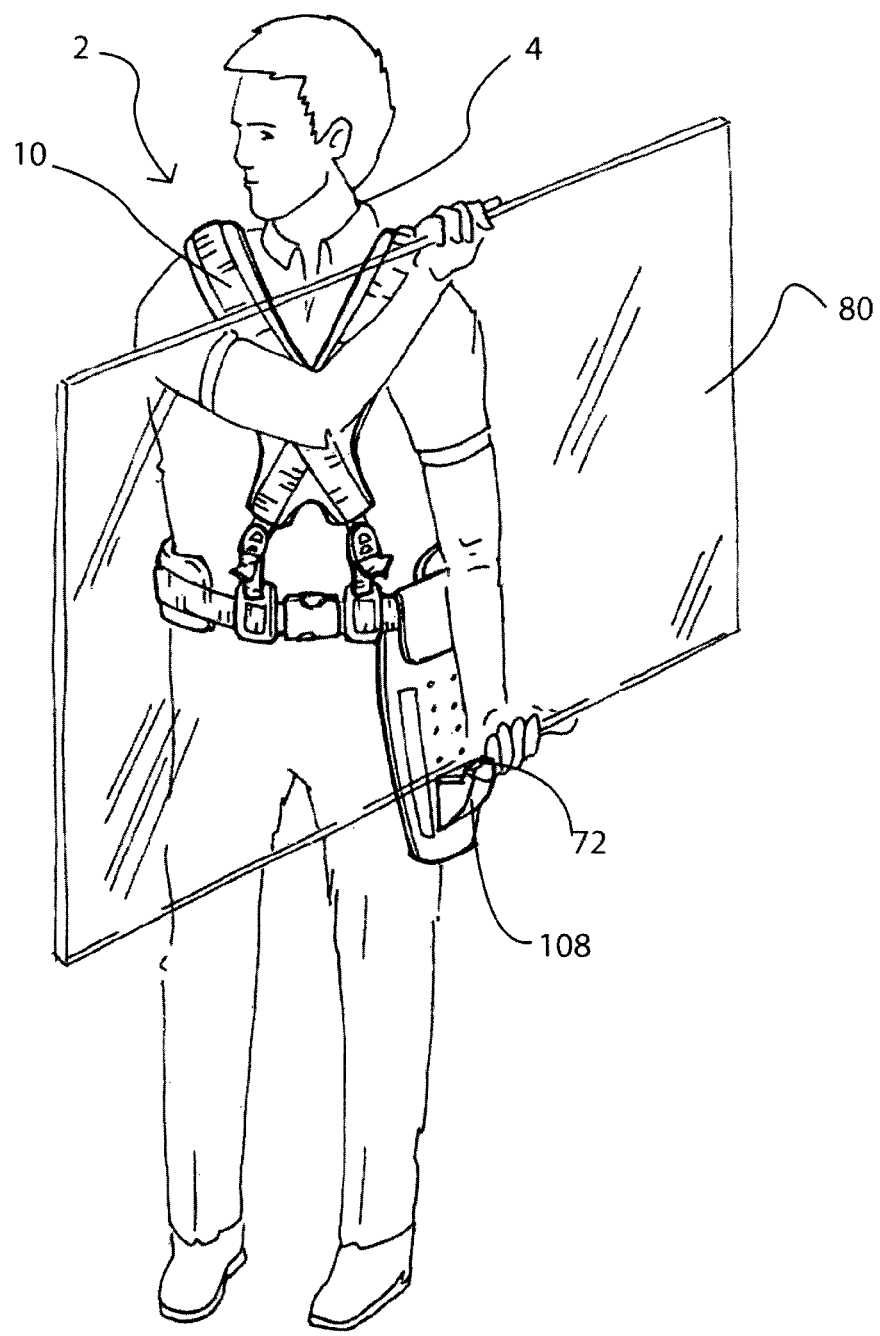
FIG. 17 is a front perspective view of a user carrying a glass sheet with the object carrying device of FIG. 16.

The projecting member 44 comprises a weight supporting portion 64 and a lateral retaining lip 66. In this embodiment, the weight supporting portion 64 is flat and wide making it suitable to support wide elongate objects with a flat underside such as a mattress 68 (as shown in FIG. 9). The retaining lip 66 blocks the mattress from sliding laterally off the weight supporting portion 64.

Figure 5:
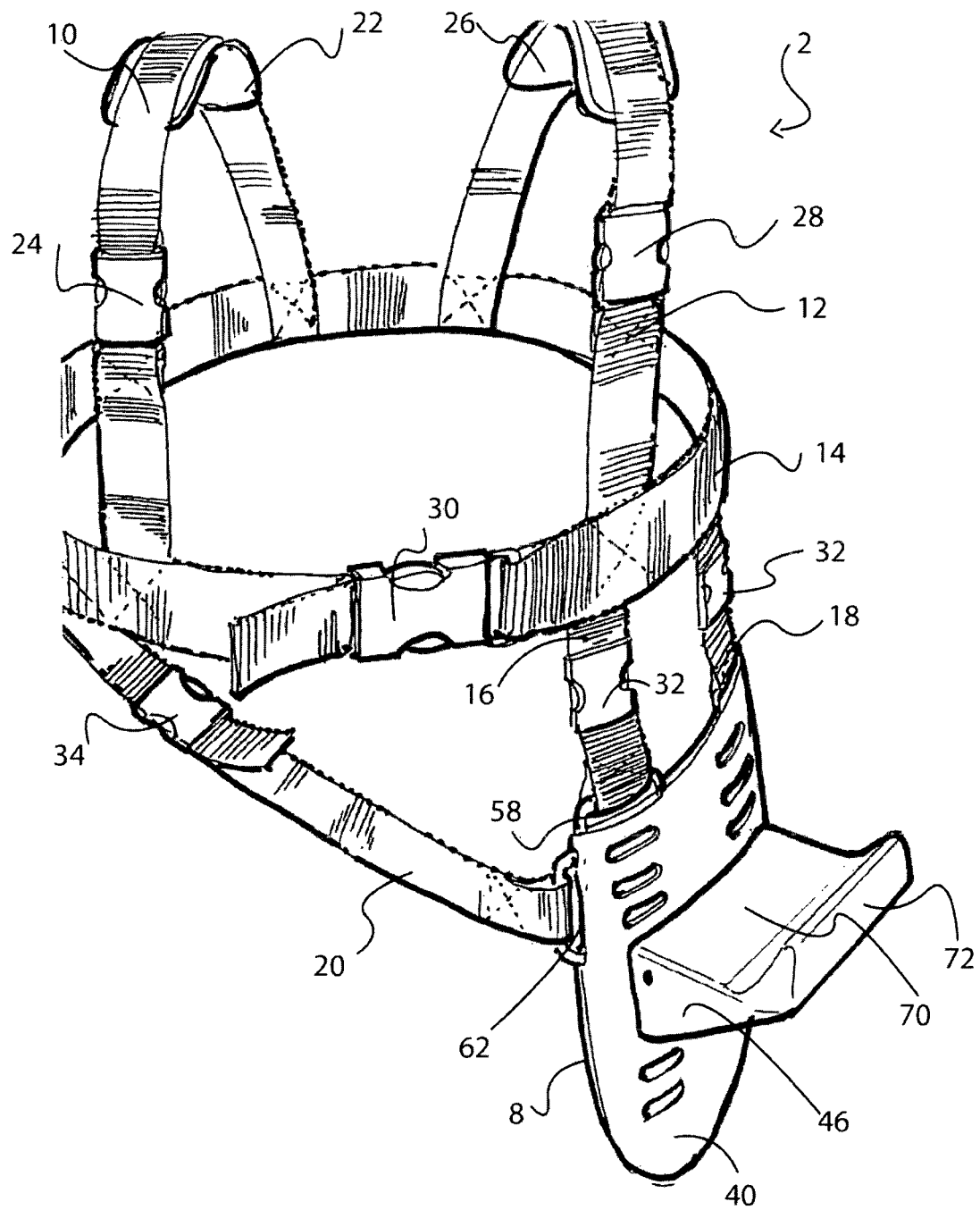
FIG. 5 is a front view of an object carrying device with a height adjustable projection having a lateral retaining lip.

In the embodiment shown in FIG. 7, the projecting member 46 has a weight supporting portion 70 which is angled downwardly away from the body plate and a lateral retaining lip 72 (see also FIG. 5). This projecting member arrangement may be more suitable for carrying thinner elongate objects, or those elongate objects with a narrow or curved base.

The embodiment in FIG. 6 also shows a pair of Velcro straps 74 which may be tied between respective pairs of top and bottom hooks, 54 and 56 respectively, following their insertion into apertures 52 of the body plate 40.

Figure 2:
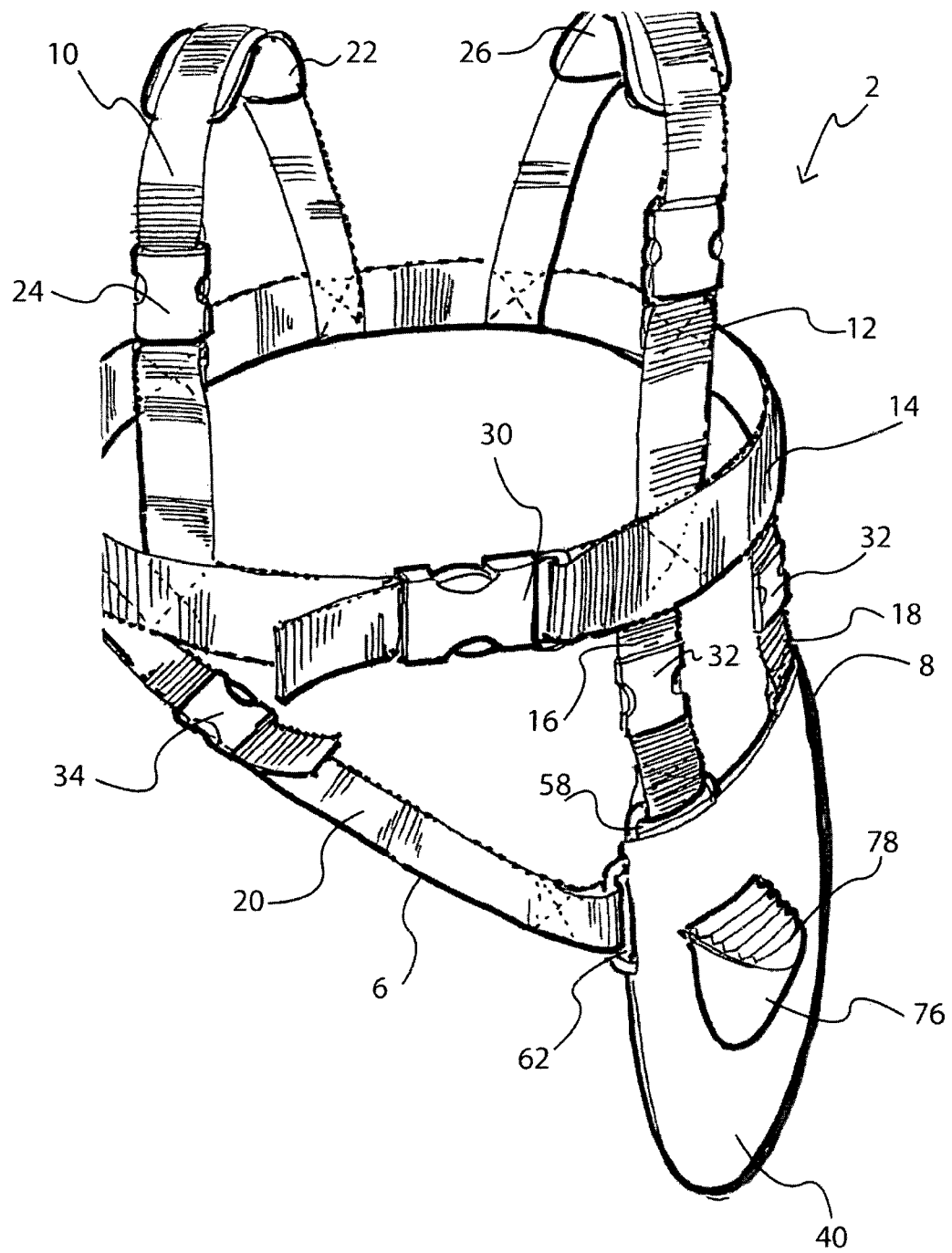
FIG. 2 is a front perspective view of an object carrying device with a fixed projection for supporting an object.
Figure 8:
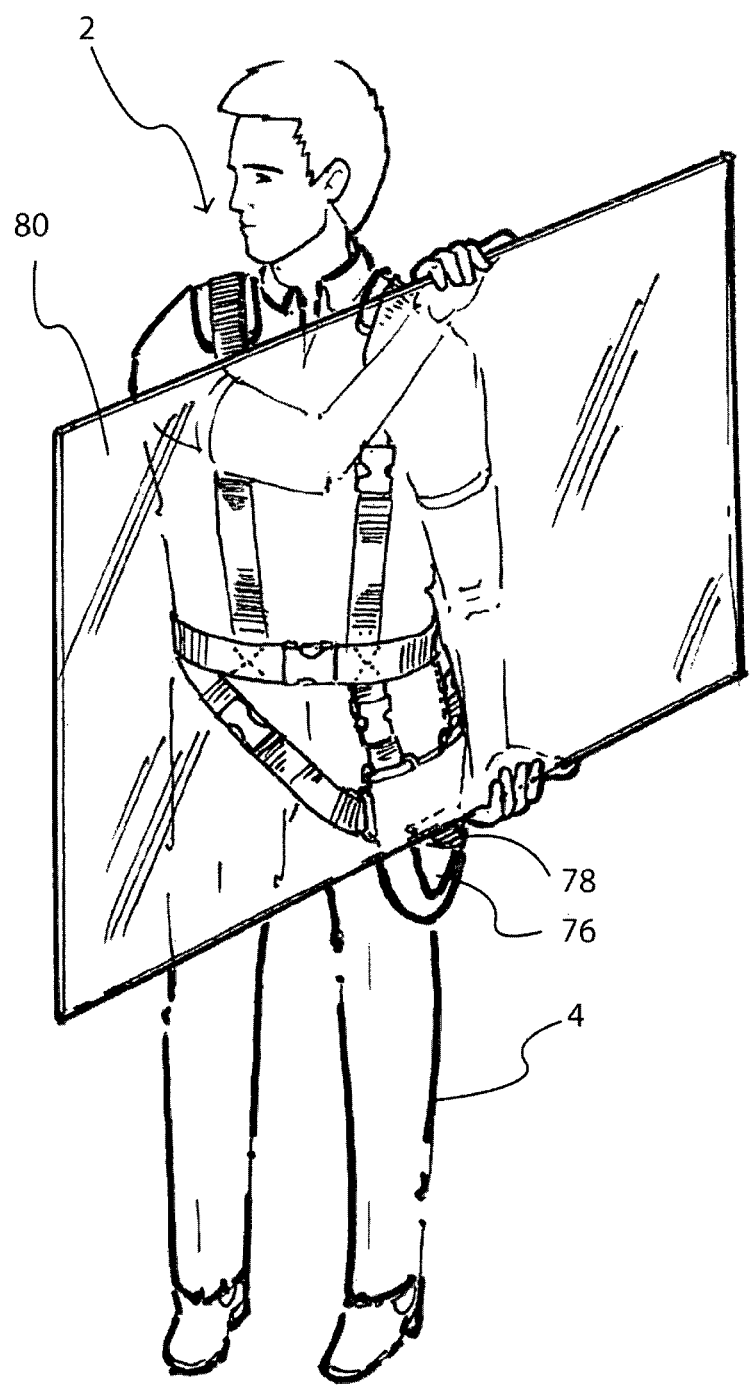
FIG. 8 is a perspective view of a user carrying a glass sheet with an object carrying device.

Referring now to the embodiments shown in FIGS. 2 and 8, the projecting member 76 is permanently affixed to the body plate 40. Thus the projecting member 76 is not height adjustable with respect to the body plate, and no apertures 52 of the body plate 40, or hooks 54 and 56 of the projecting member 76, are required. The projecting member 76 is shaped somewhat like a vertically transected cone, having a plate supporting surface 78 which is adapted to support objects such as a glass panel 80 (as shown in FIG. 8).

Figure 3:
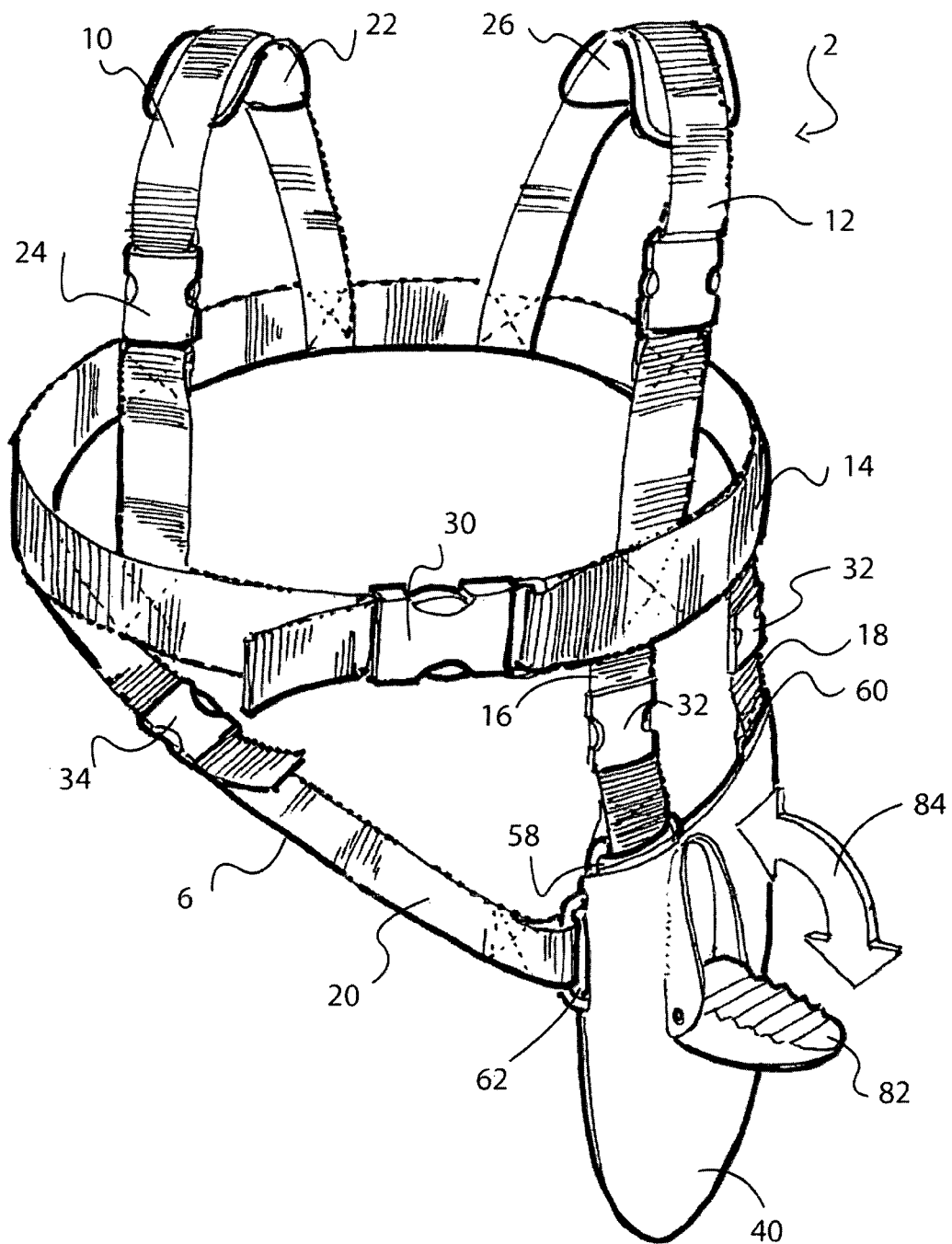
FIG. 3 is a front perspective view of an object carrying device having a projection which is pivotal between weight bearing and folded positions.

In the embodiment shown in FIG. 3, there is a projecting member 82 which is pivotable with respect to the body plate 40, as indicated by arrow 84, between a weight supporting position (as shown) and a folded position whereby the projecting member 82 is folded along the outer surface of the body plate 40.

Figure 4:
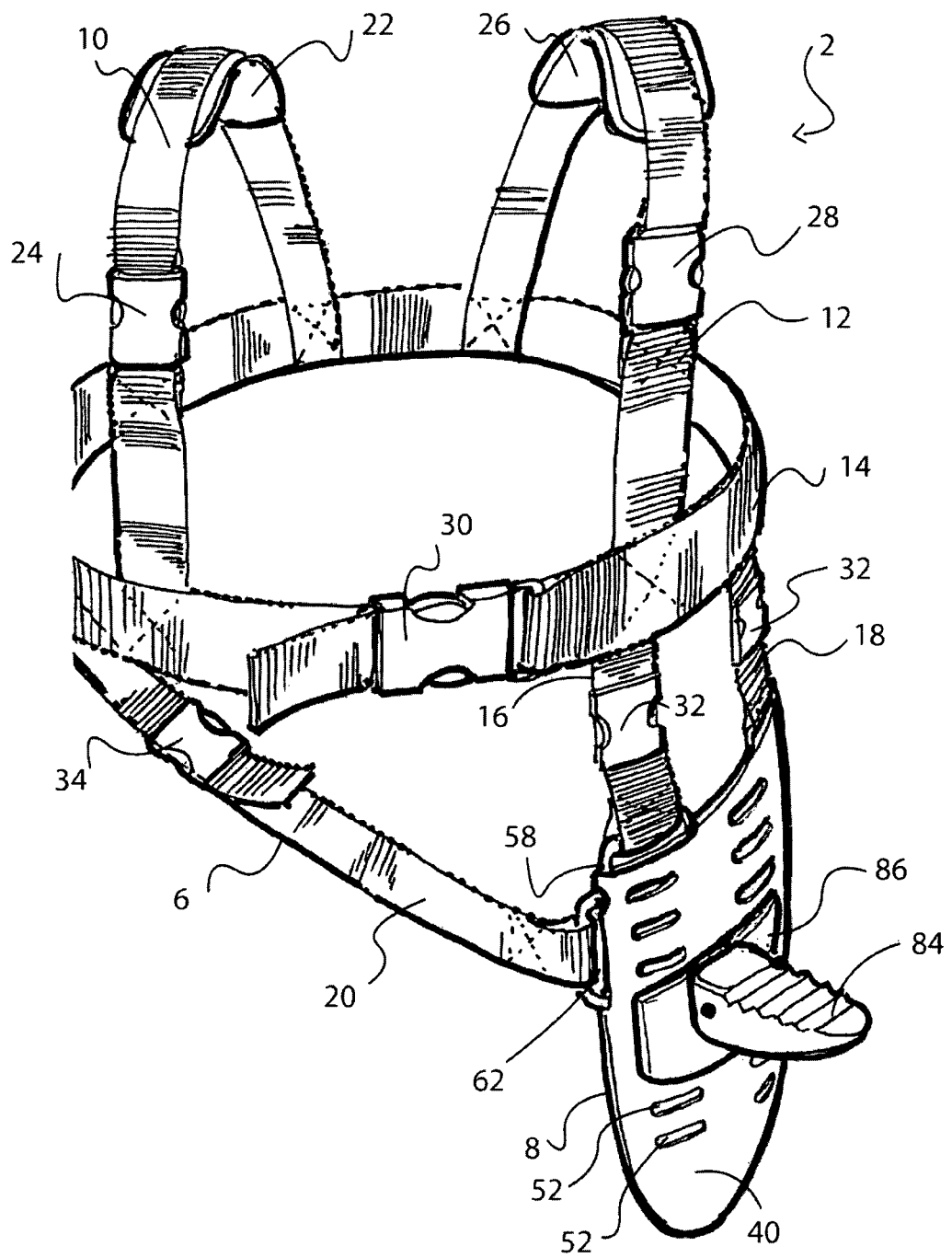
FIG. 4 is a front perspective view of an object carrying device with a height adjustable support projection.

The embodiment shown in FIG. 4 has a projecting member 84 which is shaped similarly to the projecting member 82 of FIG. 3, but further has an adjustment plate 86 with rearwardly extending hooks (not visible) which are adapted for insertion into the adjustment apertures 62 of the body plate 46, thereby enabling height adjustment of the projecting member 84.

The object carrying device 2 may be used in the following manner:

The user 2 puts on the body harness 6 and adjusts the various straps to fit.

An elongate object (such as the glass panel 80 shown in FIG. 8 or the mattress 68 shown in FIG. 9) with an elongate length, a height which is about one third to two thirds of the length, and a width which is preferably less than 30 cm, is placed on the weight supporting portion of the projecting member about the middle third of the undersurface of the objects length.

The user grasps over the top surface of the length of the object about its middle third with their contralateral hand.

The user then grasps the under surface of the elongate object, posteriorly to the projecting member, with their ipsilateral hand.

An elongate object may also be carried by two users simultaneously, with each user wearing an object carrying device which is used to support the elongate object.

Referring now to FIGS. 10 to 17, there is shown a further embodiment of an object carrying device 2. In this further embodiment, the first and second shoulder straps, 10 and 12 respectively, cross over each other in front and behind the user's 4 torso, thereby forming a chest cross 86 and a back cross 88.

After crossing, the first and second shoulder straps, 10 and 12 respectively, attach anteriorly and posteriorly on to the waist strap 14 via respective buckles 110. The waist strap 14 is fed through the buckles 110 so as to enable the user to move the buckles 110 around their waist and along the waist strap 110 as desired.

Each of the shoulder straps has a length adjusting buckle 92, and above each of the buckles 92 extends shoulder strap padding 90 which pads out the chest cross 86 before extending over the shoulders of the user 4 and into the back cross 88.

The waist strap 14 has an inner Velcro™ surface 94 which is adapted to be fastened with a corresponding outer Velcro™ surface 96 on each of a pair of waist pads 98. The waist pads 98 may be removably fastened to the inner surface of opposite sides of the waist belt, and may be removed, moved around, and fastened to the waist belt at the desired region.

The body plate 40 is more elongated than in the previous versions of the object carrying device 2 shown, so as to span a greater portion of the length of the thigh. This greater length enables direct engagement with the waist strap 14 via a hooking member 100 designed to hook over the waist strap 14 and lodge it between the hooking member 100 and the outer surface of the body plate 40.

The hooking arrangement allows the object carrying portion 8 to be disengaged from the waist belt and placed on the opposite side of the user if desired, as well as enabling sliding of the object carrying portion around the waist strap 14. Thus, the user may carry the object on either side of their body, and may adjust the position of the body plate, either more laterally or more anteriorly as preferred by the user. A more lateral orientation of the body plate may be desired when carrying longer objects or objects which are suitably carried by two people, one standing behind the other, whereas a more anterior position of the body plate may be more desirable for taller shorter objects.

On the rear surface of the body plate is a thigh cushion 102, and above the thigh cushion is a paired Velcro™ surface 104 for fastening to the corresponding Velcro™ surface 96 of the ipsilateral waist pad 98.

In this embodiment the apertures 52 in the body plate 40 and thigh cushion 102 are small and rounded, with a screw thread being present in the body plate apertures 52. Each aperture is adapted to receive one of four screws 106 arranged in a square configuration and used to removably but firmly attach a projecting member 108 to the body plate 40 at the desired height.

The projecting member 108 has a generally horizontal weight supporting surface 78 which extends to a lateral retaining lip 72, and a rubber grip 48 sits on the weight supporting surface between the lip 72 and the body plate 40.

While this invention has been described in connection with specific embodiments thereof, it will be understood that it is capable of further modification(s). The present invention is intended to cover any variations, uses or adaptations of the invention following in general, the principles of the invention and including such departures from the present disclosure as come within known or customary practice within the art to which the invention pertains and as may be applied to the essential features hereinbefore set forth.

As the present invention may be embodied in several forms without departing from the spirit of the essential characteristics of the invention, it should be understood that the above described embodiments are not to limit the present invention unless otherwise specified, but rather should be construed broadly within the spirit and scope of the invention as defined in the broad consistory statements. Various modifications and equivalent arrangements are intended to be included within the spirit and scope of the invention and consistory statements herein. Therefore, the specific embodiments are to be understood to be illustrative of the many ways in which the principles of the present invention may be practiced.

Where the terms "comprise", "comprises", "comprised" or "comprising" are used in this specification, they are to be interpreted as specifying the presence of the stated features, integers, steps or components referred to, but not to preclude the presence or addition of one or more other features, integers, steps, components to be grouped therewith.

The invention claimed is:

1. An object carrying device suitable for carrying a narrow elongated object towards one side of a user's body without assistance from another person, the device comprising,
   a body harness, the body harness comprising,
      a first shoulder strap adapted to be slung over a shoulder of the user,
      a second shoulder strap, adapted to be slung over the opposite shoulder of the user to that of the first shoulder strap, and
      a waist strap adapted to wrap around the waist of the user, and
   an object carrying portion disposed or disposable on the body harness, the object carrying portion comprising,
      a body plate vertically elongated to more than double its width and disposed or disposable on the waist strap towards one side of the user's body, the elongated length of the body plate extending downwardly from the waist strap at least mid-way down the user's thigh so as to traverse a middle portion of the length of the user's thigh, wherein the body plate is curved horizontally along its width to conform to the shape of the user's thigh so as to hug thereagainst when carrying the object, and
      a support member disposed or disposable on a lower region of the body plate so as to project outwardly from the lower region of the body plate and the middle portion of the length of the user's thigh and being adapted for supporting an object thereon, wherein the body plate includes a plurality of receiving portions formed therein, wherein the support member includes at least one projecting member adapted for engagement with at least one of the receiving portions, and
   wherein the support member is locatable at a height adjacent the user's thigh that enables the user to carry the object on the support member by grasping over the top of the object with their contralateral hand and under the bottom of the object behind the support member with their ipsilateral hand.

2. The object carrying device according to claim 1 wherein the object carrying portion is removably engaged with the body harness.

3. The object carrying device according to claim 1 wherein the object carrying portion may be engaged on either side of a user's body.

4. The object carrying device according to claim 1 wherein the position of the object carrying portion is adjustable around the user's waist.

5. The object carrying device according to claim 1 wherein the object carrying portion comprises a hooking member adapted for movable, and removable, engagement with the harness.

6. The object carrying device according to claim 1 wherein the height of the support member is adjustable with respect to the object carrying portion.

7. The object carrying device according to claim 1 wherein the receiving portions are arranged vertically on the body plate for enabling height adjustment of the support member.

8. The object carrying device according to claim 1 wherein the support member comprises a gripping surface on which the object is supported.

9. The object carrying device according to claim 1 wherein the support member comprises a retaining lip for limiting lateral movement of the object on the support member.

10. The object carrying device according to claim 1 wherein the first and second shoulder straps cross over at the front and rear of the user's torso before inserting into the user's the waist strap.

11. The object carrying device according to claim 1 wherein the first and second shoulder straps and the waist strap are lengthwise adjustable.

12. The object carrying device according to claim 1 wherein the body plate is attached to the waist strap and extends downwardly therefrom.

13. The object carrying device according to claim 1 wherein the body plate is cushioned on its internal thigh hugging surface.

* * * * *